No. 684,077. Patented Oct. 8, 1901.
E. MARCHAND.
STUMP OR STONE EXTRACTOR.
(Application filed Dec. 7, 1900.)

(No Model.)

Witnesses:
J. F. Groat.
John F. Daufferwiel

Eric Marchand, Inventor
By Marion & Marion
Attorneys

THE NORRIS PETERS CO., PHOTO-LITHO., WASHINGTON, D. C.

UNITED STATES PATENT OFFICE.

ERIC MARCHAND, OF ST. PRIME, CANADA.

STUMP OR STONE EXTRACTOR.

SPECIFICATION forming part of Letters Patent No. 684,077, dated October 8, 1901.

Application filed December 7, 1900. Serial No. 39,035. (No model.)

*To all whom it may concern:*

Be it known that I, ERIC MARCHAND, a subject of Her Majesty, the Queen of Great Britain, residing at St. Prime, in the county of Chicoutimi, Lake St. John, Province of Quebec, Canada, have invented certain new and useful Improvements in Stump and Stone Extractors; and I do hereby declare that the following is a full, clear, and exact description of the invention, such as will enable others skilled in the art to which it appertains to make and use the same.

My invention relates to improvements in stump and stone extractors; and the object in view is a simple and powerful extractor which can be readily hauled from one place to another, adjusted over the object to be lifted, and operated either by horse-power or by manual effort.

With these ends in view the invention consists in a stump and stone extractor embodying novel features of construction, as will be hereinafter fully described and claimed.

Figure 1:
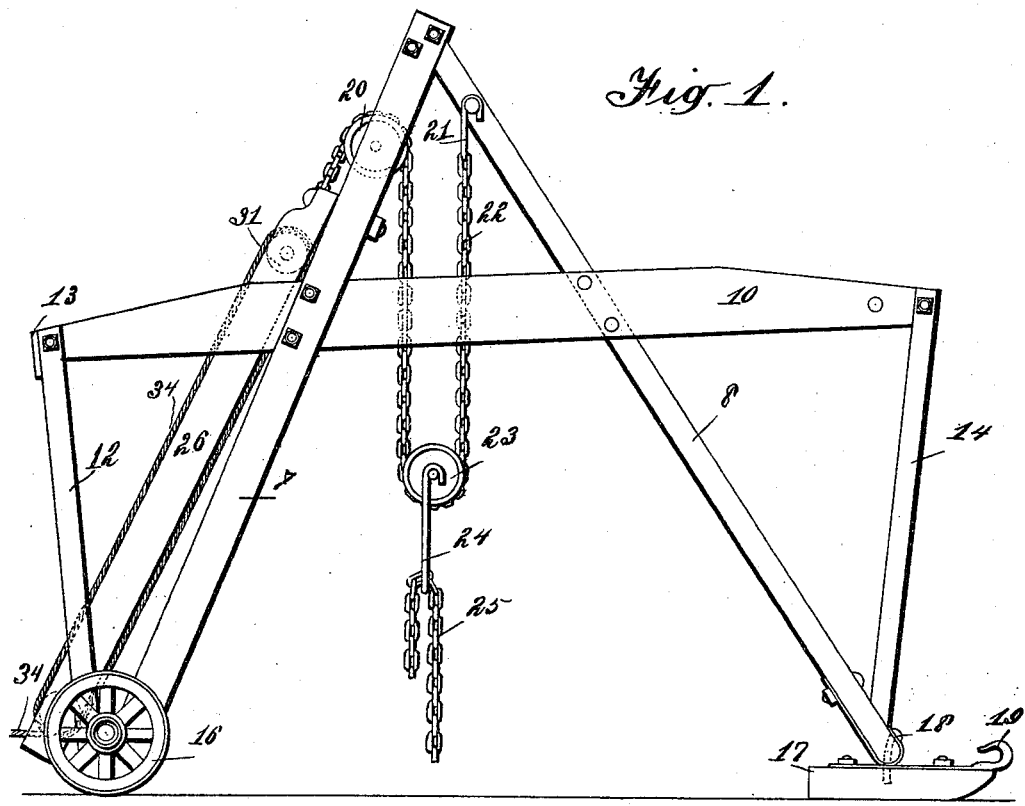
Figure 2:
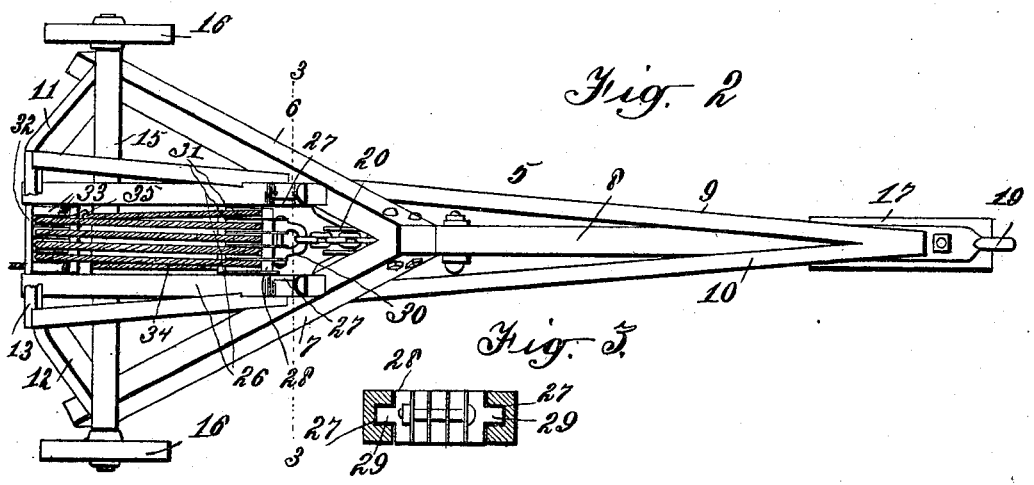
Figure 3:
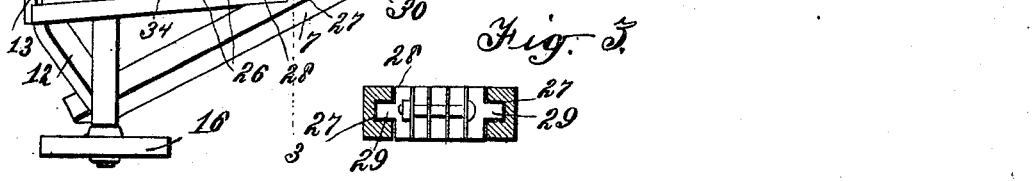

In the drawings hereto annexed, forming a part of this specification, Figure 1 is a side elevation of a machine embodying my invention. Fig. 2 is a plan view thereof. Fig. 3 is a detail cross-section on the line 3 3 of Fig. 2.

The same numerals of reference denote like parts in each of the several figures of the drawings.

The operating parts of my machine are all mounted on a portable frame, which is indicated in its entirety by the numeral 5. In the preferred construction shown by the accompanying drawings this frame consists of the pair of converging uprights 6 7, the inclined front upright 8, the substantially horizontal beams 9 10, the rear braces 11 12, the rear cross-bar 13, and the front brace 14. The lower ends of the uprights 6 7 are united with the corresponding ends of the braces 11 12 to an axle 15 through the medium of suitable bolts, said axle being equipped with suitable carrying-wheels 16. Said rear braces 11 12 are joined by the cross-bar 13, which also connects the rear ends of the horizontal beams 9 10, the latter diverging laterally from their front ends to the rear ends. Said beams extend between the uprights 6 7, while the other upright 8 is disposed between the beams, all these parts being firmly joined together to produce a frame which is braced at all points of strain. The front brace 14 connects the lower end of the upright 8 and the front ends of the beams, and this front part of the frame rests upon a ground-shoe 17, the latter being connected loosely by a bolt, as at 18, to the foot of the upright 8. It will be noted that the rear part of the frame is mounted on the carrying-wheels and the front part on the shoe, thus rendering the apparatus portable. The shoe is equipped with the draft-hook 19, adapted for the attachment of a whiffletree, whereby the apparatus may be hauled across a field.

20 designates a sheave which is journaled on a suitable arbor in the space between the upper ends of the converging uprights 6 7, and to the other upright 8 is pivoted a clevis 21. A lifting-chain 22 has one end attached to this clevis and leads over the sheave 20, so as to form a bight, in which is arranged a traveling sheave 23, the latter resting upon the chain and equipped with a depending clevis 24, in which is adjusted or engaged the chain 25, that is adapted to be fitted around or otherwise engage with the object to be lifted, such object being in the form of a tree-stump, a heavy stone, or any other object of weight.

26 designates a pair of parallel track-bars which are arranged within the frame in inclined positions, the upper portions of said track-bars being firmly secured to the uprights 6 7 or to the horizontal beams, while the lower ends thereof are bolted to the axle 15. Said track-bars are provided in their opposing faces with the coincident parallel grooves 27. A traveling pulley-block 28 is slidably fitted between the track-bars, so as to be housed therein, said pulley-block having the projecting ribs or fins 29, that are snugly fitted in the grooves 27 and which limit the pulley-block to slidable movement between the track-bars. Said pulley-block has a link 30 connected pivotally to its upper portion, and the pulley-block is furthermore equipped with a series of sheaves 31.

32 designates a stationary pulley-block provided with a series of sheaves 33, and this pulley-block is secured firmly in place between the track-bars at the lower ends thereof.

34 is a haulage-cable which is reeved around the sheaves 31 of the traveling pulley-block and the sheaves 33 of the stationary pulley-block, one end of said cable being attached to a stationary eyebolt 35 on the fixed pulley-block, while the other end of the cable leads away from the apparatus, so that a whiffletree may be connected thereto, thus adapting the cable to be hauled by horse-power, although two or more men may pull thereon, if desired.

It will be understood that the lifting-chain 22 has one end connected to the clevis 21 on the frame, while the other end of said chain is attached to the link 30 of the traveling pulley-block.

It is thought that the operation and advantages of the apparatus will be readily apparent from the foregoing description taken in connection with the drawings.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

I claim—

1. A stump-extractor comprising a suitable frame, parallel track-bars secured firmly thereon and provided with guideways, a traveling pulley-block having suitable projections fitted slidably in said guideways, a stationary pulley-block, a lifting-chain connected with the frame and with the traveling pulley-block, and a haulage-cable fitted to said pulley-blocks to form a multiplying connection therewith, substantially as described.

2. A stump-extractor comprising a frame having a wheeled axle at one end and a loose shoe at the other end, track-bars secured firmly to the frame and provided with guideways, a pulley-block secured in a stationary position at the lower end of the track-bars, a slidable pulley-block engaging with the guideways, a lifting-chain connected to the frame and to the slidable pulley-block, suitable sheaves for said chain, and a haulage-cable, substantially as described.

In witness whereof I have hereunto set my hand in the presence of two witnesses.

ERIC MARCHAND.

Witnesses:
E. F. FLUHMANN,
ERNEST MARCHAND.